United States Patent
Schubring et al.

(10) Patent No.: US 6,341,917 B1
(45) Date of Patent: Jan. 29, 2002

(54) DOUBLE ENDED STUD FASTENING SYSTEM

(75) Inventors: Gary L. Schubring, New Baltimore; Allen Dale Moring, Grosse Pointe Woods, both of MI (US); Darren Shaun Byrne, Naugatuck, CT (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/352,561

(22) Filed: Jul. 13, 1999

Related U.S. Application Data

(60) Provisional application No. 60/114,275, filed on Dec. 30, 1998.

(51) Int. Cl.[7] ................................................. F16B 13/04
(52) U.S. Cl. ............................. 403/296; 403/299; 411/5
(58) Field of Search ............................... 403/296, 292, 403/299; 411/5, 3, 389

(56) References Cited

U.S. PATENT DOCUMENTS

| | | | | |
|---|---|---|---|---|
| 3,897,713 A | * | 8/1975 | Gugle | 411/389 X |
| 4,186,645 A | * | 2/1980 | Zaydel | 411/389 X |
| 4,611,093 A | * | 9/1986 | Farmer et al. | 411/5 X |
| 5,171,115 A | | 12/1992 | McWilliams et al. | |

FOREIGN PATENT DOCUMENTS

| | | |
|---|---|---|
| DE | 36 10 976 A1 | 10/1987 |
| EP | 0 122 685 A1 | 10/1984 |
| EP | 0 286 244 A1 | 10/1988 |
| GB | 2 274 697 A | 1/1994 |
| JP | 37-29315 | 10/1937 |
| JP | 48-18972 | 6/1973 |
| JP | 60-40809 | 3/1985 |
| JP | 62-242112 | 10/1987 |

OTHER PUBLICATIONS

Engineering Materials Handbook, vol. 2, Engineering Plastics, 1988, pp. 722–725.
Emhart Fastening Teknologies—NPR Wire Harn . . . , internet site: http://135.145.6.182/products/npr/wire.htm, Jul. 1, 1999, 2 pages.
Design Handbook for DuPont Engineering Polymers, Module 1, General Design Principles, Assembly Techniques, pp. 97–99 (published prior to 1998).
Machine Design, Basics of Design Engineering, Jun. 1992, pp. 325–326, 331, 338–339, 342–344, 347–348, 350, 355–357, 358–362, 364–365, 367–368.
Poplock Fastening System, Emhart Automotive, by Al Moring, whole booklet (believed to have been published or publicly disclosed prior to Dec. 30, 1998).
Emhart Fastening Teknologies, internet site: www.emhart.com/products, Dec. 28, 1998.
Emhart—Dodge Inserts, internet site: www.emhart.com/products/dodge, Apr. 21, 1999 (believed to have been offered for sale or publicly used prior to Dec. 30, 1998).

* cited by examiner

Primary Examiner—Lynne H. Browne
Assistant Examiner—John R. Cottingham
(74) Attorney, Agent, or Firm—Harness, Dickey & Pierce, P.L.C.

(57) ABSTRACT

The preferred embodiment of a double ended stud fastening system includes a first segment for engaging a plastic component, a second threaded segment for engaging a nut and a lateral projection disposed between the segments. In another aspect of the present invention, the first segment is threaded and the lateral projection is a flange.

34 Claims, 7 Drawing Sheets

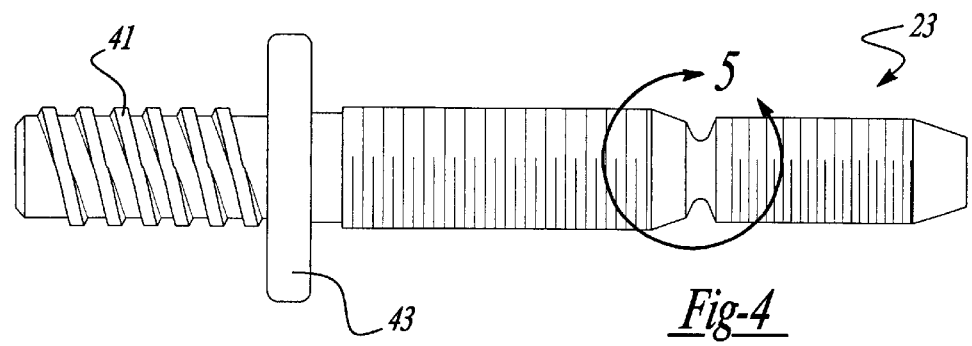
*Fig-4*
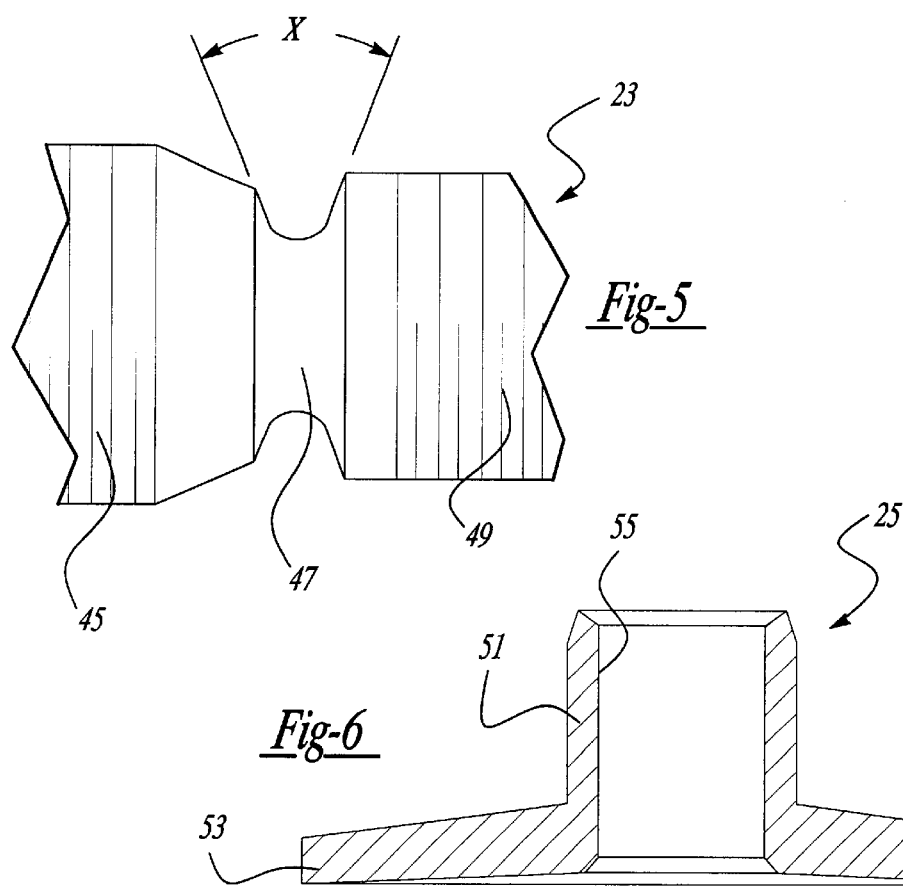
*Fig-5*
*Fig-6*
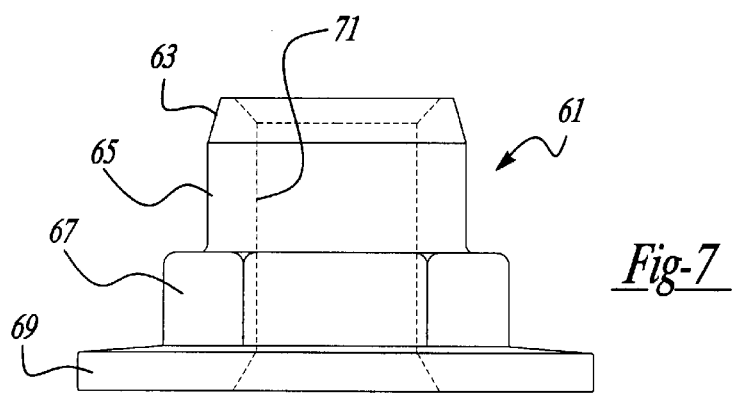
*Fig-7*

DOUBLE ENDED STUD FASTENING SYSTEM

CROSS REFERENCED TO RELATED APPLICATIONS

This is a continuation-in-part of copending U.S. Provisional Application Serial No. 60/114,275, filed on Dec. 30, 1998, which is incorporated by reference herein.

BACKGROUND OF THE INVENTION

This invention relates generally to fasteners and more specifically to a double ended stud fastening system.

It is common to arc weld an enlarged circular end of a threaded metal stud onto a sheet metal body panel of an automotive vehicle. Various parts are then inserted upon the single threaded stud and an internally threaded nut is rotationally inserted onto the stud. However, the nut installation is a time consuming process which often leads to undesirably varying fastening forces.

It is also known to use a pneumatic tool to swage and compress an unthreaded metal nut or sleeve over the arc welded stud in a torque-free manner. This torque-free construction employs a two-part stud, separated by a reduced diameter neck. The tool pulls off the threaded end after the nut is secured to the remaining threaded part of the stud. The nut can be unscrewed and reused. This stud is almost exclusively used without the need for holes in the sheet metal body panel. However, it is often undesirable to arc weld a stud directly to the sheet metal body panel. For example, the welding station is fairly expensive and takes up considerable space in the assembly plant. Furthermore, it is impractical to arc weld such a conventional stud to a plastic component instead of to the body panel. Thus, there is a need to secure a stud fastener directly to a plastic component while using a torque-free nut and a two segment threaded stud, in order to secure a plastic component to a body panel.

It is also known to press insert, insert mold or ultrasonically insert a knurled fastener into a plastic panel. See, for example, U.K. Patent Application GB 2 274 697 A entitled "Part Mounting Device and Method" which was published on Aug. 3, 1994. However, the bolt shown in FIG. 7B of the U.K. application is of a conventionally threaded variety using a standard threaded nut.

SUMMARY OF THE INVENTION

In accordance with the present invention, the preferred embodiment of a double ended stud fastening system includes a first segment for engaging a plastic component, a second threaded segment for engaging a nut and a lateral projection disposed between the segments. In another aspect of the present invention, the first segment is threaded and the lateral projection is a flange. A further aspect of the present invention provides a third segment, joined to the second segment by a reduced diameter neck, which is removable from the second segment after the nut is compressibly secured to the second segment of the stud. A method of fastening a panel to a member using a fastener is also provided.

The present invention is advantageous over traditional devices, in that the present invention fastener is secured to the plastic component off of the quickly moving assembly line and then the plastic component and fastener assembly are quickly attached to the body panel with a compression sleeve or nut. Engagement of the nut onto the threaded stud does not require any torque upon the nut or stud, thereby maintaining the desired mounting of the stud to the plastic component. Furthermore, a low cost nut can be used since it does not employ internal threads prior to insertion upon the stud. Moreover, the nut can be unscrewed and reused. The component-to-panel fastening also advantageously occurs on a single side of the body panel and is very quickly installed, compared to pre-threaded nuts, since the traditional nut run-down time is not required. Thus, the no torque fastening system of the present invention is ideally suited for direct mounting to plastic components. Additional advantages and features of the present invention will become apparent from the following description and appended claims, taken in conjunction with the accompanying drawings.

BRIEF DESCRIPTION OF THE DRAWINGS

FIG. 4 is a side elevational view showing the preferred embodiment stud of the present invention fastening system;

FIG. 5 is an enlarged side elevational view, taken within circle 5 of FIG. 4, showing the preferred embodiment stud of the present invention fastening system;

FIG. 6 is a cross sectional view showing the first preferred embodiment nut of the present invention fastening system;

FIG. 7 is side elevational view showing a second preferred embodiment nut of the present invention fastening system;

DETAILED DESCRIPTION OF THE PREFERRED EMBODIMENTS

Figure 1:
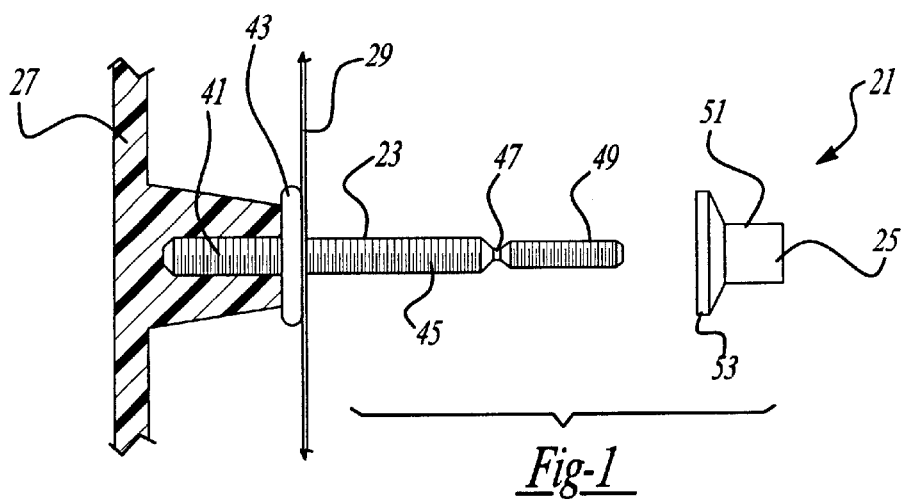
FIG. 1 is a partially exploded and fragmented side elevational view showing a first preferred embodiment of a fastening system of the present invention.
Figure 2:
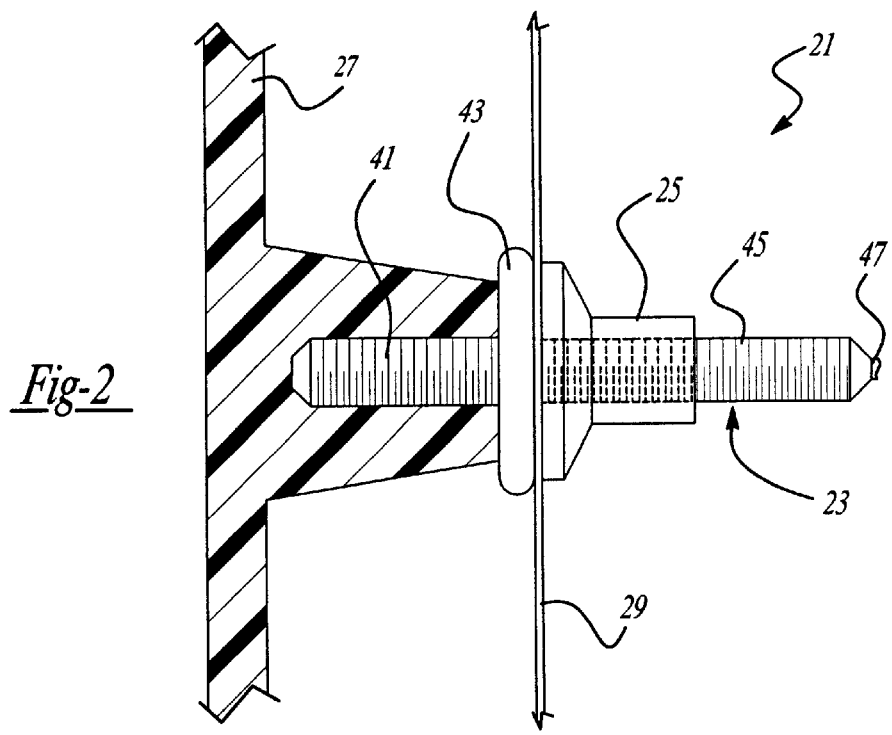
FIG. 2 is an assembled and partially fragmented side elevational view showing the first preferred embodiment of the present invention fastening system.
Figure 3:
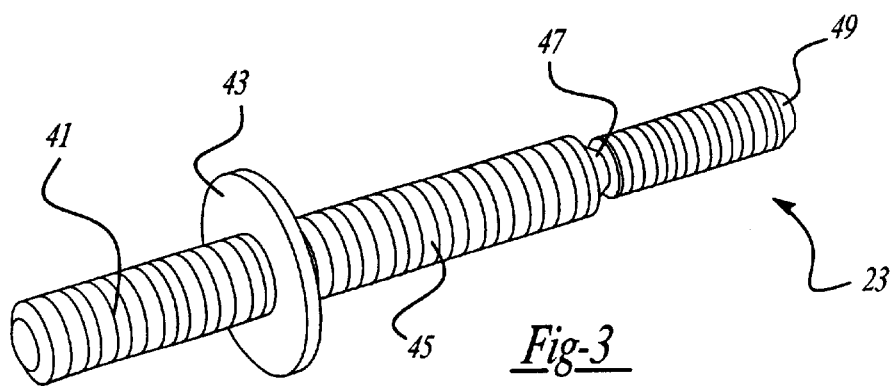
FIG. 3 is a perspective view showing the preferred embodiment stud of the present invention fastening system.

Referring to FIGS. 1 and 2, the first preferred embodiment of the fastening system 21 of the present invention employs a stud fastener 23 and a nut 25. The nut 25 is also known as a sleeve. Stud 23 and nut 25 serve to fasten a plastic component or member 27 to a panel 29. Plastic component 27 can be an automotive vehicle part, such as: an exterior mirror housing; heating/ventilation/air conditioning blower, heater, insulator, duct or shield; wire harness locator; hose locator; exterior trim panel; interior garnish molding; bumper fascia; tail light; and side window mounting. Panel 29 is preferably a stamped sheet metal body panel.

Stud 23 includes a first threaded segment 41, a circular flange 43, a second threaded segment 45, a neck 47 and a third threaded segment 49. This can best be viewed in FIGS.

3–5. First threaded segment 41 has a T6 by 1.6 mm thread, second threaded segment 45 has a M6 by 1.5 mm thread, and third threaded segment 49 has a M5 by 0.8 mm thread. The threads define external engagement patterns on the stud. Furthermore, neck 47 has a reduced diameter as compared to the threaded segments. Neck 47 is also provided with a forty degree (total) angular taper x and a circumferential radius at the apex of the taper to define the reduced diameter section. Stud 23 is preferably machined from 1010 steel.

FIGS. 1 and 6 show the first preferred embodiment nut 25. This nut 25 has a circular-cylindrical section 51 and an enlarged diameter portion 53. Nut 25 has a smooth and unthreaded internal aperture 55 prior to installation onto stud 23.

FIG. 7 illustrates a second preferred embodiment nut 61. Nut 61 has an externally chamfered end 63, a circular-cylindrical section 65, a hexagonal wrench receiving formation 67 and an enlarged diameter portion 69. Nut 61 also has a smooth and unthreaded internal aperture 71 prior to installation onto stud 23. Nuts 25 and 61 are preferably formed from 1010 steel.

Figure 8:
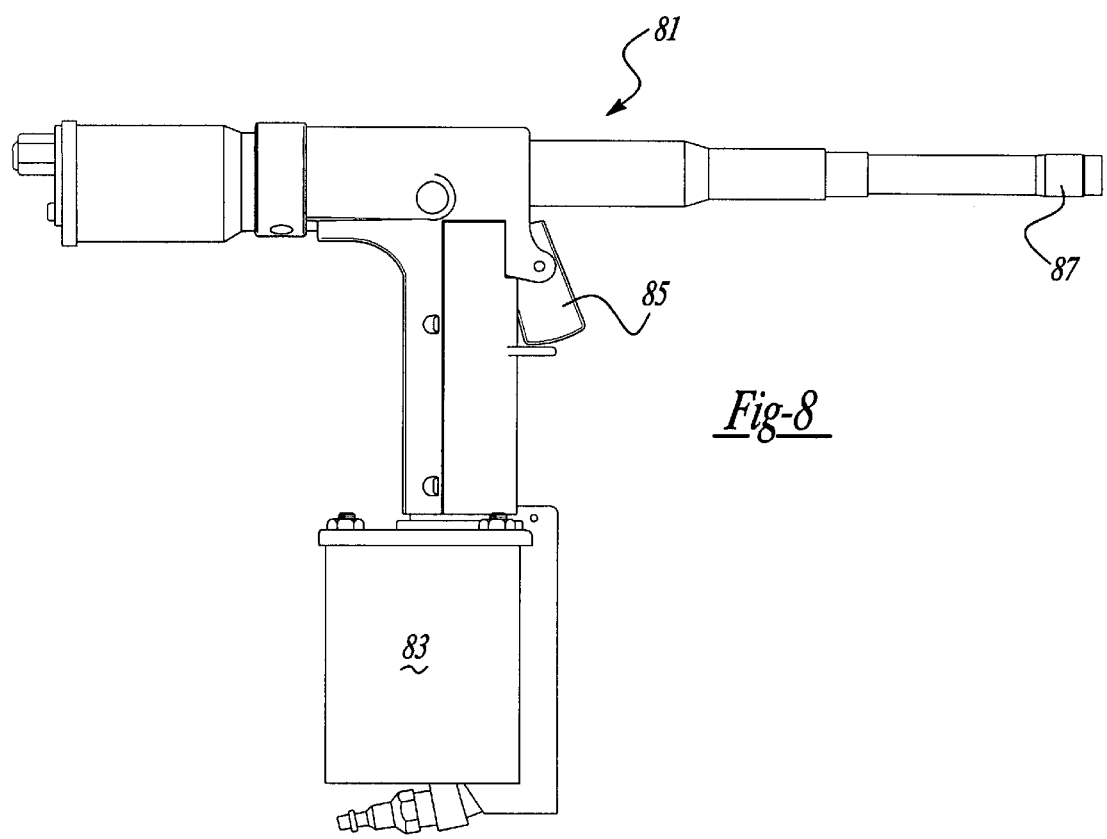
FIG. 8 is a side elevational view showing the preferred embodiment fastening tool of the present invention fastening system.
Figure 10:
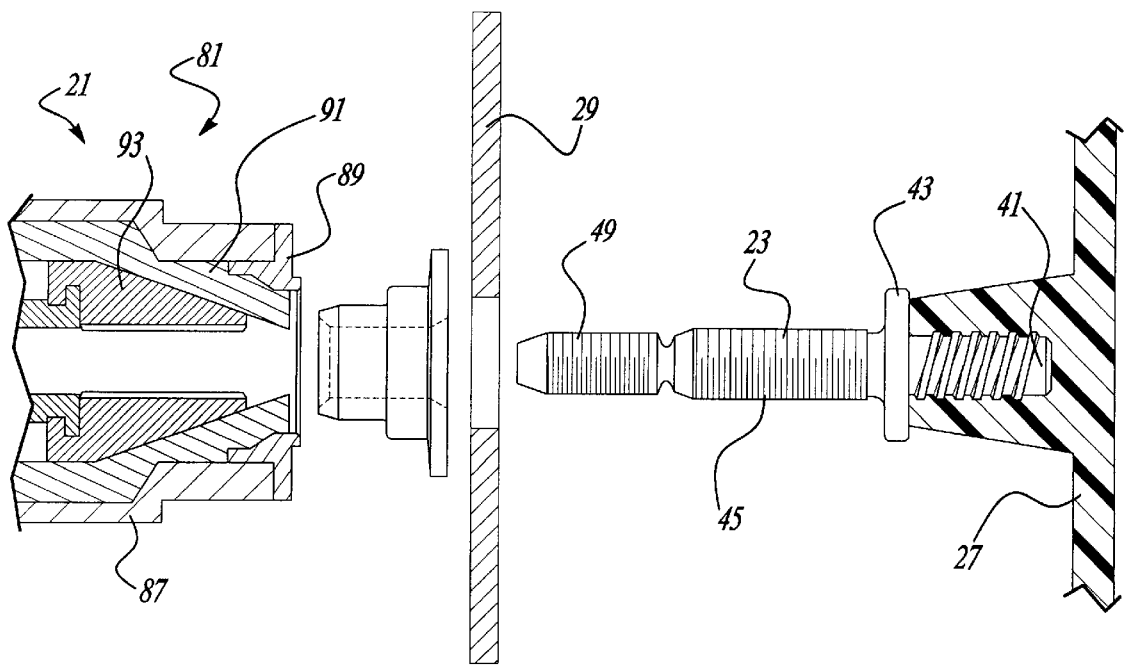

A pneumatically actuated fastening/setting tool 31 is shown in FIGS. 8 and 10. Tool 81 employs a piston cylinder 83 and trigger 85 to operate parts inside a nose 87. Tool 81 uses a standard air pressure between 85 and 100 psi to generate about 3000–5000 N of clamping force at the joint. Nose 87 of tool 81 further has a nose piece 89, jaw case 91 and jaw 93.

Figure 9:
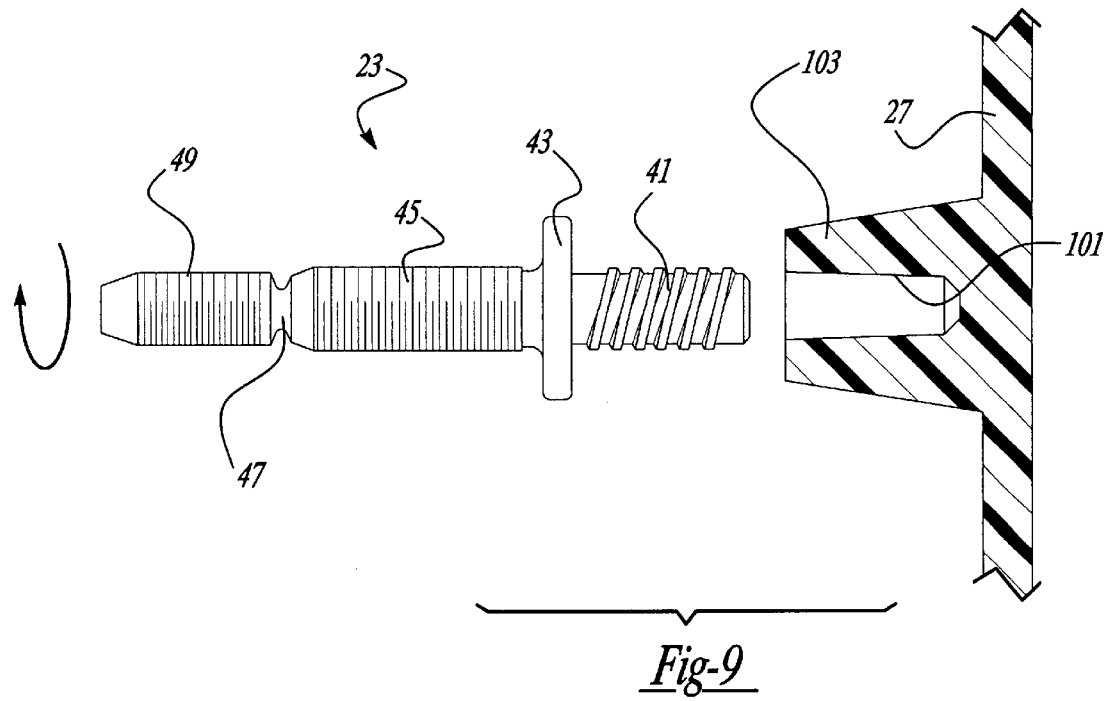
FIGS. 9–14 are a series of partially fragmented, side elevational views showing the assembly sequence of the second preferred embodiment of the present invention fastening system.

The sequence of fastening stud 23 to plastic component 27 and then, in turn, to panel 29 can be observed with reference to FIGS. 9–14. First, component 27 is injection molded from a plastic material such as Nylon. An unthreaded bore 101 is simultaneously formed inside a projecting boss 103. Second, first threaded segment 41 is rotated while being pushed into bore 101, as shown in FIG. 9. The threads of stud 23 cause the internal surface of boss 103 to become threaded. Alternately, a threaded or knurled end of a stud can be insert molded into the boss; however, the stud cannot be easily disassembled from the component, unlike with the preferred embodiments.

Third, the assembly consisting of component 27 and stud 23 is placed adjacent to an outside surface of panel 29. Flange 43 of stud 23 abuts and contacts against panel 29. Fourth, second and third threaded segments 45 and 49 are inserted through a slightly larger circular hole in panel 29. Fifth, nut 61 (or nut 25) is linearly slid past third threaded segment 49 and onto second threaded segment 45. This can be seen by comparing FIGS. 10 and 11.

Figure 11:
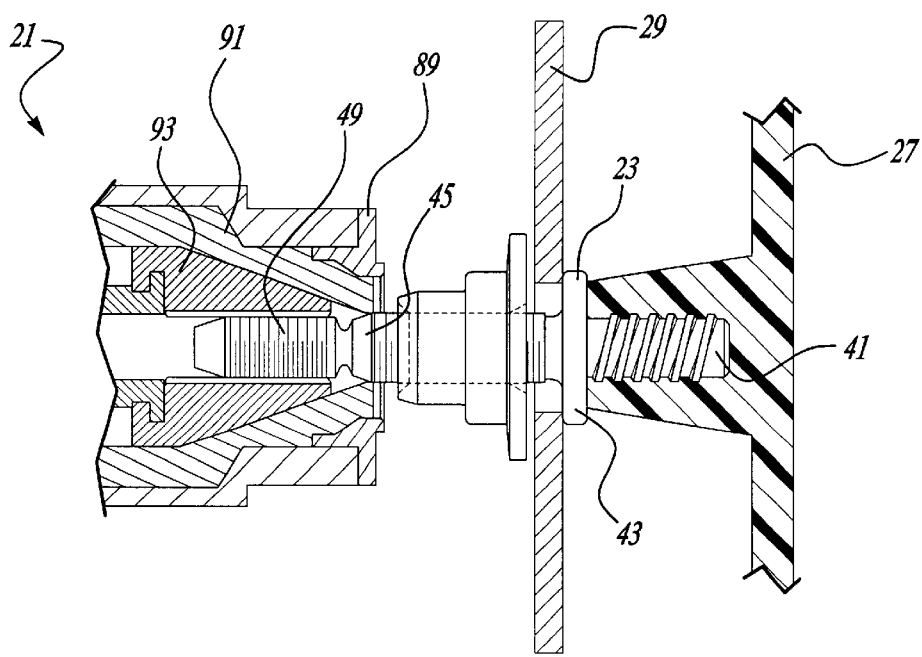
Figure 12:
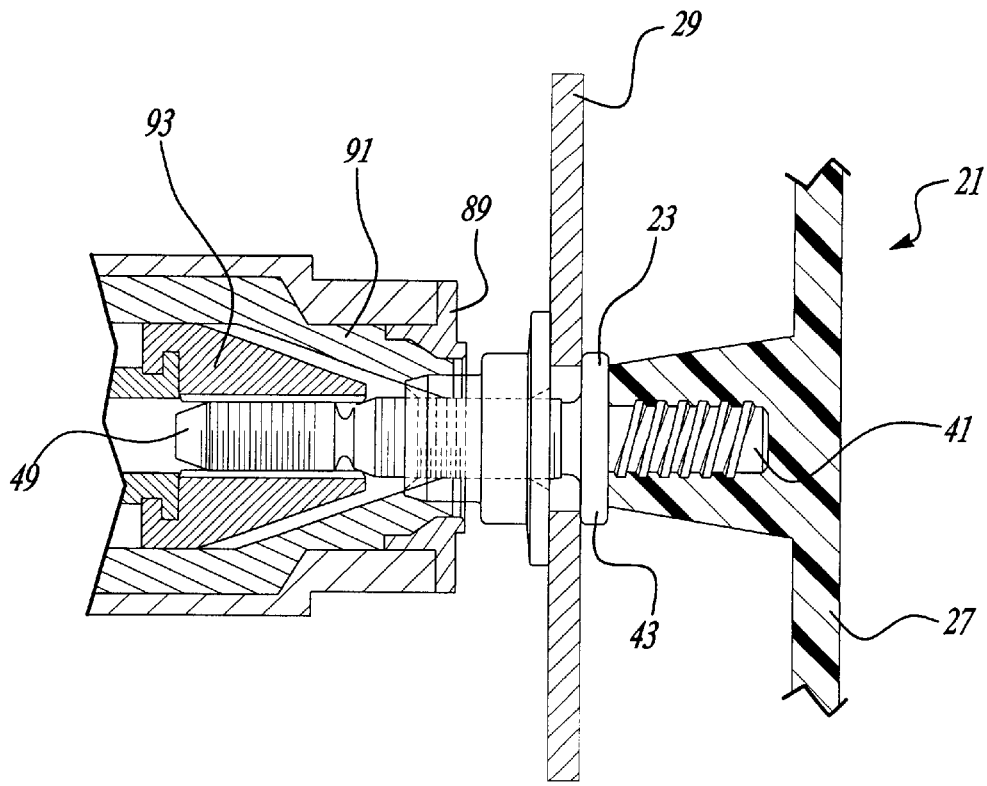

Sixth, referring to FIGS. 11 and 12, tool 81 is linearly inserted onto stud 23 and nut 61. This step may be concurrent with the prior step. Third threaded segment 49, acting as a mandrel, is received inside of jaw 93 while nose piece 89 and a distal end of jaw case 91 surround cylindrical section 65 of nut 61. Seventh, jaw 93 firmly grips third threaded segment 49 while jaw case 91 linearly pushes nut 61 into desired abutting contact against the inside surface of panel 29, creating a preload instead of torque. Eighth, jaw case 91 is caused to swage and compress cylindrical section 65 of nut 61 in an inward lateral manner thereby forming threads on aperture 71 of nut 61. This advantageously causes identically matching threads and eliminates the traditional problem of cross-threading of misaligned pre-threaded nuts and bolts. Moreover, the tool does not significantly apply any rotational or torquing force upon stud 23 or nut 61 during fastening; this preserves the secure relationship of stud 23 to component 27 and achieves high and repeatable quality of fastening forces to panel 29.

Figure 13:
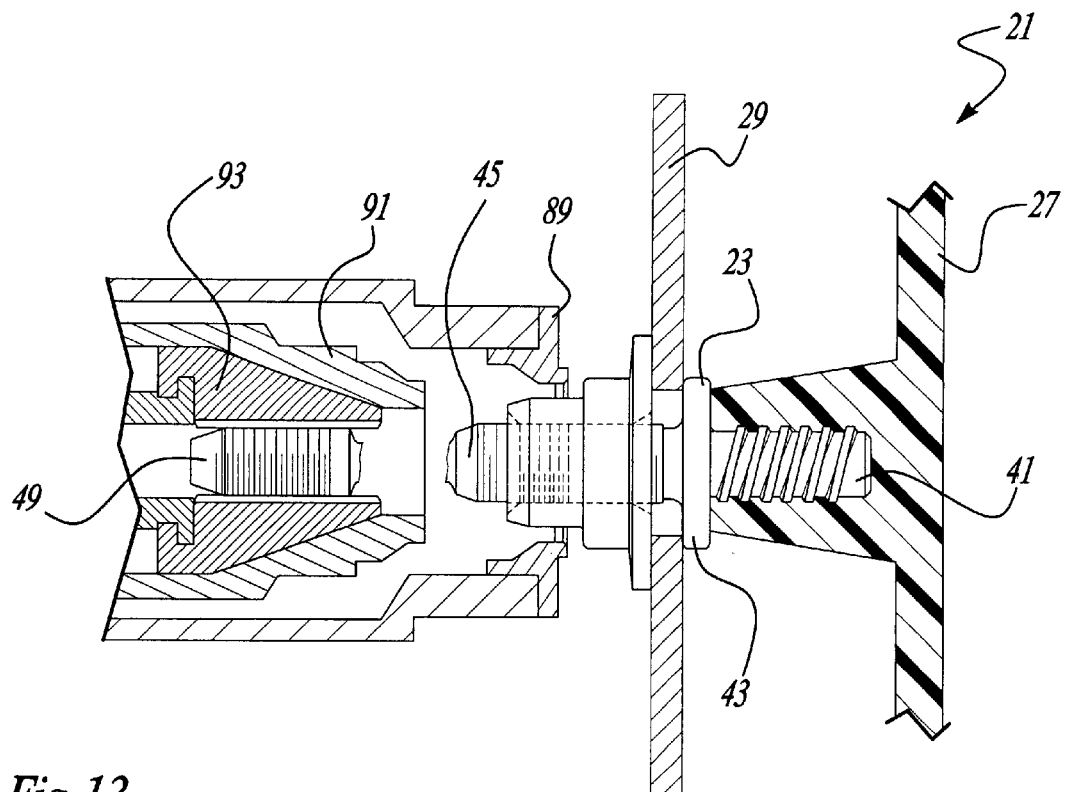
Figure 14:
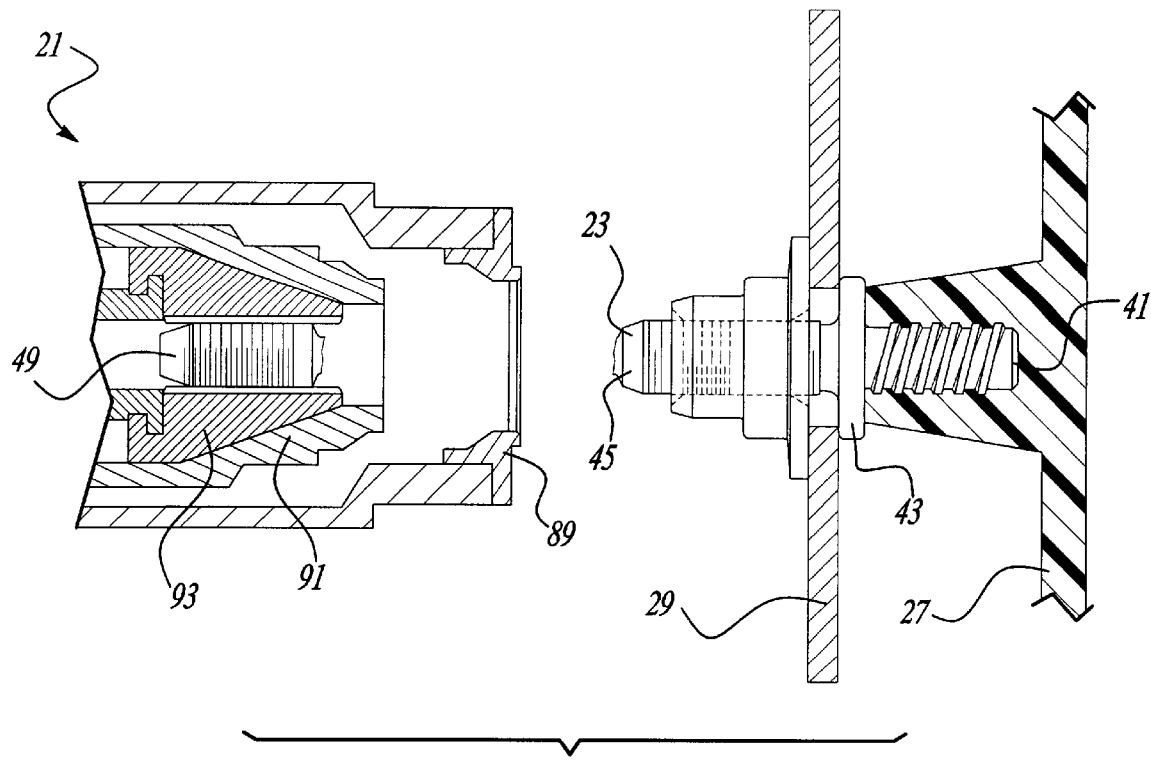

Finally, a comparison of FIGS. 12–14 demonstrates breaking of neck 47 wherein jaw 93, still retaining third threaded segment 49, is linearly moved away from second threaded segment 45. Third threaded segment 49 is then discarded. Nut 61 can thereafter be unscrewed from stud 23 by use of a wrench. Nut 61 can be reusable approximately five times.

Figure 15:
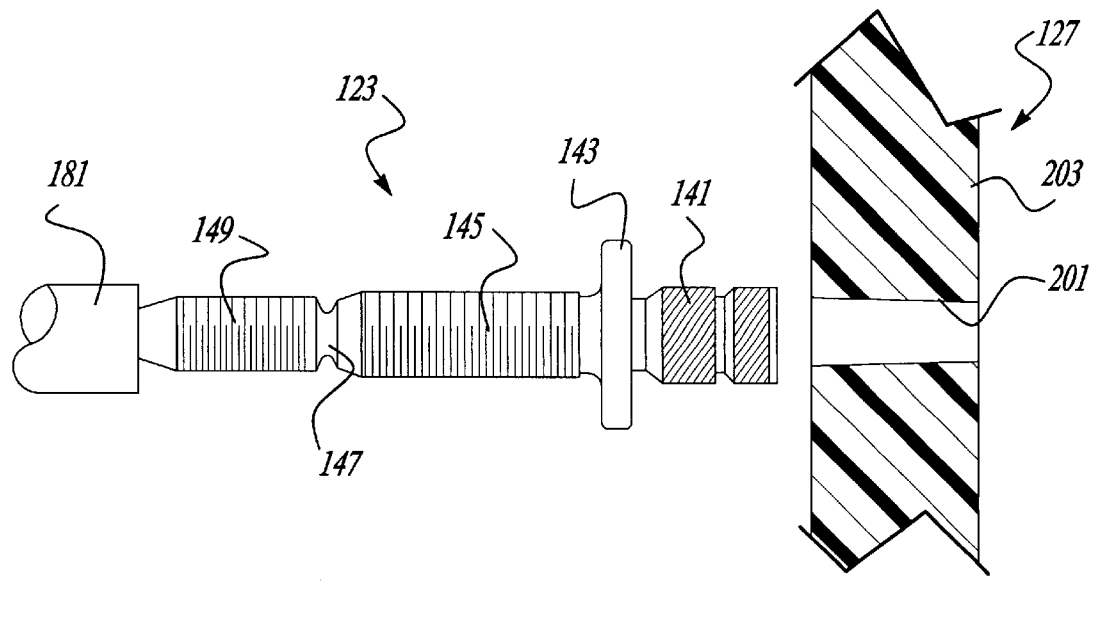
FIG. 15 is an exploded side elevational view, partially in section, showing a third preferred embodiment of the present invention fastening system.

A third preferred embodiment of the fastening system is shown in FIG. 15. In this embodiment, a stud 123, like that with the first preferred embodiment, has a pair of threaded segments 145 and 149 joined by a reduced diameter neck 147. A large diameter circular flange 143 is integrally attached to segment 145. However, a distinguishing feature from the prior embodiments is that a knurled segment 141 is integrally attached to flange 143 in a longitudinally extending and coaxial manner. Knurled segment 141 includes a pair of nominal diameter circular sections with a generally parallel knurl pattern on the external radial surfaces of the sections. These knurled sections are separated by a reduced diameter section. Another reduced diameter and smooth section is located between flange 143 and knurled segment 141.

An ultrasonic horn tool or high temperature conducting tool 181 is positioned adjacent a distal end of stud 123. During the ultrasonic or conductive heating operation, tool 181 serves to heat stud 123 while applying a longitudinally pushing force against the distal end of stud 123. Stud 123 is concurrently heated and inserted into a bore 201 in a fastening area 203 of a plastic component 127. Bore 201 preferably has a frusto conically tapered lead-in angle of about 8 degrees total. After tool 181 is removed or deenergized, the melted plastic is allowed to cool and rigidly engage knurled segment 141 in a permanently fastened manner. The nut swaging and neck breaking steps are subsequently performed as discussed with the prior embodiments.

Figure 16:
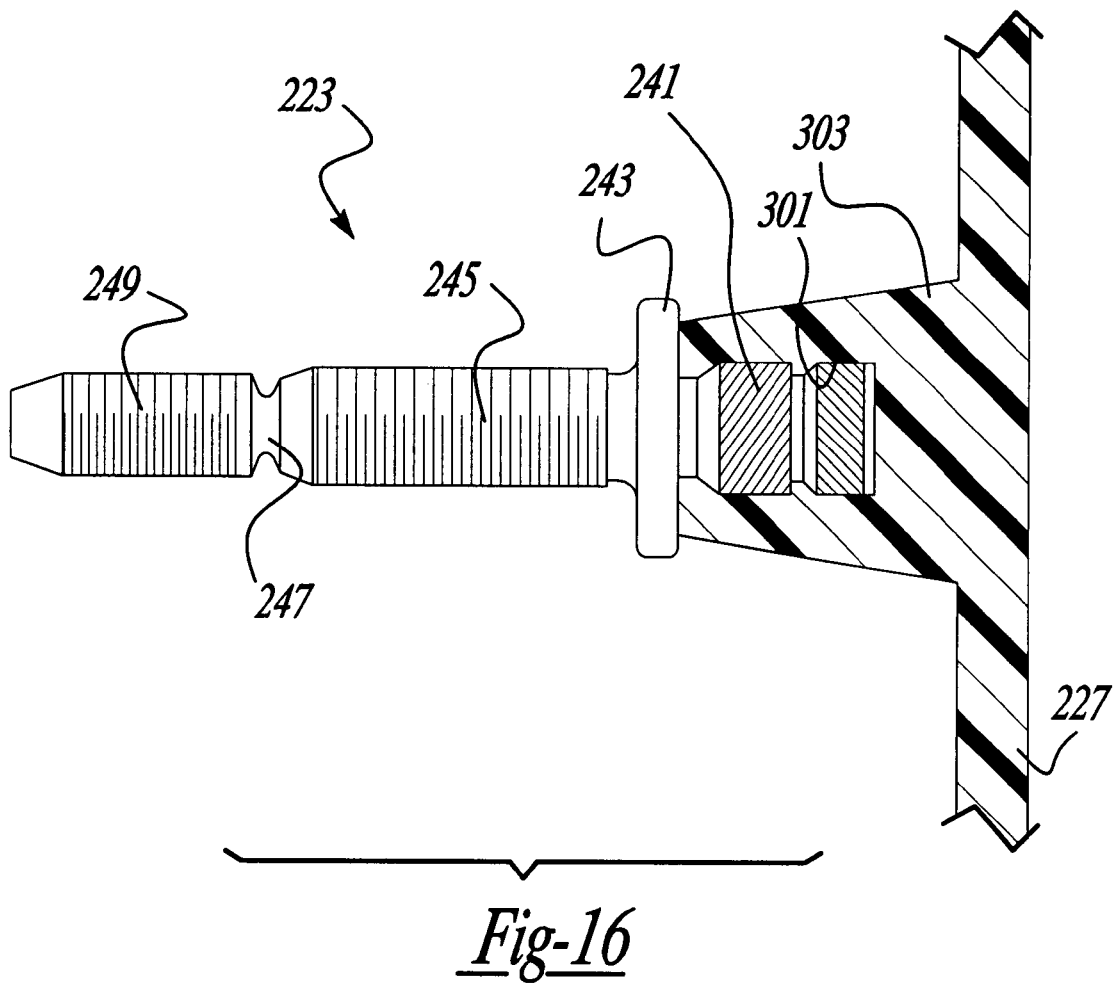
FIG. 16 is a side elevational view, partially in section, showing a fourth preferred embodiment of the present invention fastening system.

FIG. 16 illustrates a fourth preferred embodiment stud 223 having threaded segments 245 and 249 separated by a breakable neck 247. A knurled segment 241 longitudinally projects from a circular flange 243 as with the third preferred embodiment. However, with the present exemplary embodiment, an opposing or crossed knurl pattern is employed at knurled segment 241. Knurled segment 241 is ultrasonically or conductive heat inserted into a bore 301 of a projecting boss 303 depending from a plastic component 227. The plastic adjacent bore 301 is melted during the ultrasonic or heat insertion process and then allowed to reharden. Hence, the plastic material of boss 303 permanently secures stud 223 to plastic component 227. It is significant that the nut swaging operation does not tend to separate either embodiment of the knurled segments from the plastic component during the sheet metal panel fastening procedure due to employment of the circular flanges, as well as the non-rotational engagement of the nut with the corresponding threaded segments.

While various embodiments of the fastening system have been disclosed, it should be appreciated that other aspects can be employed within the scope of the present invention. For example, three or more studs may be necessary to retain a component onto a panel. Furthermore, the fastening system can be used to secure a motor housing, tube or other component to a panel of a household appliance, power tool or industrial machine. It is also envisioned that a traditionally pre-threaded nut and torquing action can be used with the present invention stud, although many of the advantages disclosed herein will not be achieved. Various materials and dimensions have been disclosed in an exemplary fashion, however, other materials and dimensions many of course be employed. It is intended by the following claims to cover these and any other departures from the disclosed embodiments which fall within the true spirit of this invention.

The invention claimed is:

1. A fastening system comprising:
 a plastic member having a bore;
 a stud having a first threaded segment and a second threaded segment, a fixed lateral projection separating the threaded segments, the lateral projection being a flange, the first segment engaging the bore;
 a nut operably engaging the second threaded segment, the nut having a substantially cylindrical section and an enlarged diameter portion; and
 a panel having a hole for receiving the second threaded segment, the flange abutting against a first side of the panel and the enlarged diameter portion of the nut abutting against an opposite second side of the panel, wherein the plastic member is fastened to the panel by the stud and the nut.

2. A fastening system comprising:
 a plastic member having a bore;
 a stud having a first threaded segment and a second threaded segment, a fixed lateral projection separating the threaded segments, the first segment engaging the bore; and
 a nut operably engaging the second threaded segment;
 a third threaded segment removably connecting to the second threaded segment opposite the first threaded segment, the threaded segments being substantially co-axially aligned with each other.

3. The fastening system of claim 2 further comprising a neck operable to join the second and third threaded segments, the neck having a smaller diameter than the second and third threaded segments.

4. The fastening system of claim 1 wherein the nut is unthreaded until compressed onto the second threaded segment.

5. The fastening system of claim 2 wherein the nut has a substantially cylindrical section and an enlarged diameter portion.

6. The fastening system of claim 5 further comprising a panel having a hole for receiving the second threaded segment, the lateral projection being a flange abutting against a first side of the panel and the enlarged diameter portion of the nut abutting against an opposite second side of the panel, whereby the plastic member is fastened to the panel by the stud and the nut.

7. The fastening system of claim 5 wherein the nut includes a wrench-receiving formation, the nut being removable from the second threaded segment and thereafter being reusably engagable upon the second threaded segment.

8. The fastening system of claim 1 wherein the bore of the plastic member is unthreaded prior to insertion of the first threaded segment.

9. The fastening system of claim 1 wherein the plastic member is an automotive vehicle mirror.

10. The fastening system of claim 1 wherein the plastic member is an automotive vehicle lamp.

11. The fastening system of claim 1 wherein the plastic member is an automotive vehicle air temperature management component.

12. The fastening system of claim 1 wherein the plastic member is an automotive vehicle bumper facia.

13. The fastening system of claim 1 wherein the plastic member is an automotive vehicle exterior trim component.

14. The fastening system of claim 1 wherein a thread type of the first segment is different than a thread type of the second segment.

15. The fastening system of claim 1 further comprising a fluid operated tool operable to secure the nut to the second segment without substantially applying a torquing force.

16. A fastening system comprising:
 (a) an automotive vehicle plastic component having an internal surface defining a bore;
 (b) a stud including:
  (i) a first segment having a patterned external surface, the first segment being operable to engage the internal surface defining the bore;
  (ii) a second segment having a patterned external surface;
  (iii) a flange separating the first and second segments;
  (iv) a third segment having a patterned external surface, the third segment being removably connected to the second segment opposite the first segment;
  iv) a neck operable to join the second and third segments, the neck having a smaller diameter than the second and third segments;
 (c) a nut operably secured to the second segment free of a substantially torquing installation force; and
 (d) an automotive vehicle panel having a hole operable to receive the second segment of the stud, the plastic component being fastened to the panel by the stud and the nut.

17. The fastening system of claim 16 wherein an internal surface of the nut is substantially smooth until compressed onto the second segment whereafter the internal surface of the nut becomes patterned from the second segment of the stud.

18. The fastening system of claim 17 wherein the nut has a substantially cylindrical section and an enlarged diameter portion.

19. The fastening system of claim 16 wherein the external surface of the second segment has a threaded pattern.

20. The fastening system of claim 19 wherein the nut includes a wrench-receiving formation, the nut is removable from the second segment and thereafter is reusably engagable upon the second segment.

21. The fastening system of claim 19 wherein the external surface of the third segment has a threaded pattern.

22. The fastening system of claim 16 wherein the external surface of the first segment has a threaded pattern.

23. The fastening system of claim 21 wherein the bore of the plastic component is substantially smooth and unthreaded prior to insertion of the first segment.

24. The fastening system of claim 16 wherein the stud further includes a flange separating the first and second segments, the flange abutting against a first side of the panel and the enlarged diameter portion of the nut abutting against an opposite second side of the panel.

25. The fastening system of claim 16 wherein the external surface of the first segment has a knurled pattern.

26. The fastening system of claim 16 wherein the plastic component is an automotive vehicle mirror.

27. The fastening system of claim 16 wherein the plastic component is an automotive vehicle lamp.

28. The fastening system of claim 16 wherein the plastic component is an automotive vehicle air temperature management component.

29. The fastening system of claim 16 wherein the plastic component is an automotive vehicle bumper facia.

30. The fastening system of claim 16 wherein the plastic component is an automotive vehicle exterior trim component.

31. The fastening system of claim 16 wherein a thread pattern of the first segment is different than a thread pattern of the second segment.

32. A fastening system comprising:
(a) an automotive vehicle plastic component having an internal surface defining a bore;
(b) a stud including:
 (i) a first segment having a thread patterned external surface, the first segment being operable to engage the internal surface defining the bore;
 (ii) a second segment having a thread patterned external surface, the thread pattern of the first segment being different than the thread pattern of the second segment;
 (iii) a flange separating the first and second segments;
 (iv) a third segment having a patterned external surface, the third segment being removably connected to the second segment opposite the first segment;
 (v) a neck operable to join the second and third segments, the neck having a smaller diameter than the second and third segments; and
(c) a nut operably secured to the second segment free of a substantially torquing installation force.

33. The fastening system of claim 2 wherein a thread type of the first segment is different than a thread type of the second segment.

34. The fastening system of claim 2 further comprising a fluid operated tool operable to secure the nut to the second segment without substantially applying a torquing force.

* * * * *

UNITED STATES PATENT AND TRADEMARK OFFICE
CERTIFICATE OF CORRECTION

PATENT NO. : 6,341,917 B1
DATED : January 29, 2002
INVENTOR(S) : Gary L. Schubring et al.

It is certified that error appears in the above-identified patent and that said Letters Patent is hereby corrected as shown below:

Column 6,
Lines 16-17, delete "a flange separating the first and second segments; (iv)".

Signed and Sealed this

Twenty-third Day of November, 2004

JON W. DUDAS
*Director of the United States Patent and Trademark Office*